United States Patent [19]

Beale

[11] 4,292,018
[45] Sep. 29, 1981

[54] DOUBLE NOZZLE BLOCK

[75] Inventor: Paul E. Beale, Columbus, Miss.

[73] Assignee: Beatrice Foods Co., Chicago, Ill.

[21] Appl. No.: 152,082

[22] Filed: May 21, 1980

[51] Int. Cl.³ .............................. B29F 1/03; B29F 1/08
[52] U.S. Cl. .................................... 425/144; 425/548;
 425/549; 425/570; 425/572
[58] Field of Search ............... 425/144, 548, 549, 567,
 425/570, 572

[56] References Cited
U.S. PATENT DOCUMENTS

| 2,896,258 | 7/1959 | Moslo | 425/DIG. 51 |
| 3,568,256 | 3/1971 | Johnson | 425/570 X |
| 3,923,209 | 12/1975 | Roy | 425/570 X |

FOREIGN PATENT DOCUMENTS 1004422  2/1977  Canada ................... 425/567

Primary Examiner—Thomas P. Pavelko
Attorney, Agent, or Firm—Nathaniel A. Humphries

[57] ABSTRACT

A double nozzle injector system includes a manifold block with an internal conical sealing surface which receives an external conical sealing surface of a spindle coupling connected to an extruder for receiving molten plastic into an axial passageway terminating at a main outflow passageway extending transversely through the coupling. An annular flushing groove encircles the coupling with a plurality of angularly spaced radial flush passageways of small diameter extending between the annular flush groove and the interior of the coupling at the main outflow passageway. Runners in the manifold block are provided with plugs having spherical surfaces for directing flow to a pair of nozzle members attached to the manifold block. Upper and lower portions of the manifold block are controlled by separate heaters and thermostats.

9 Claims, 5 Drawing Figures

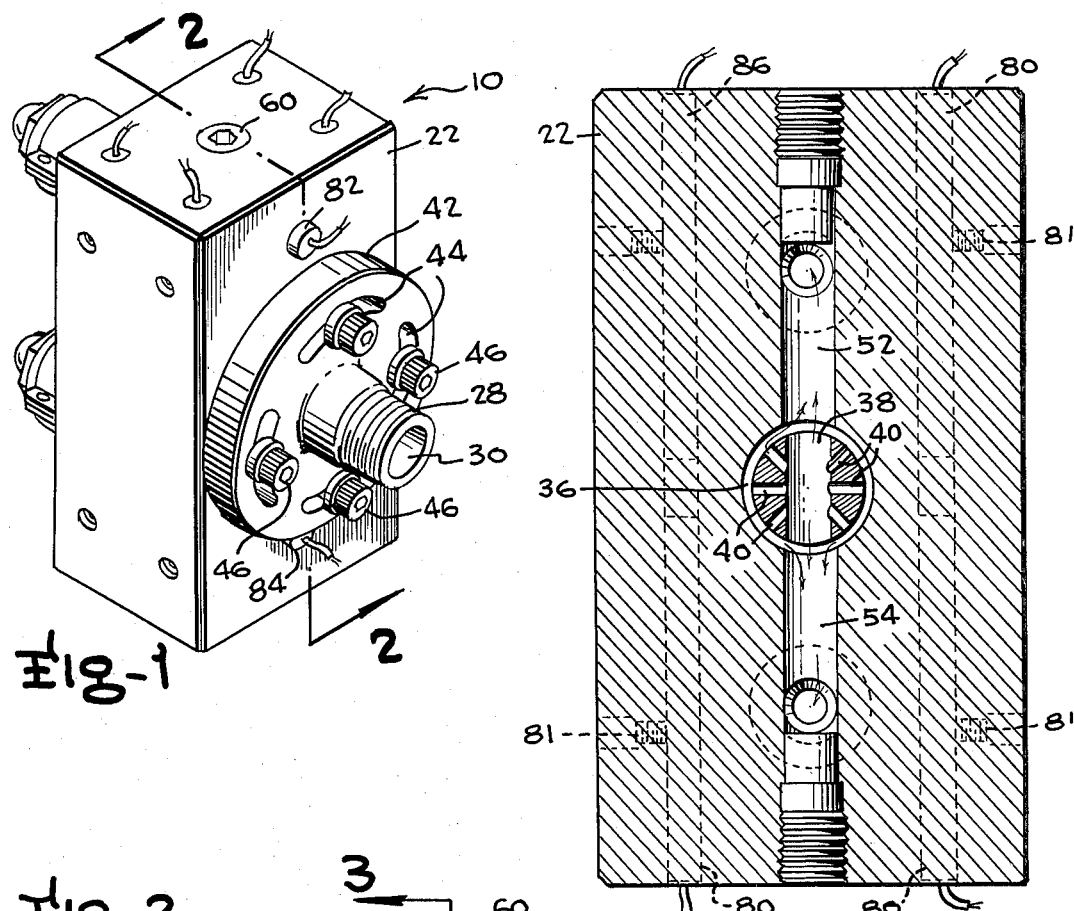
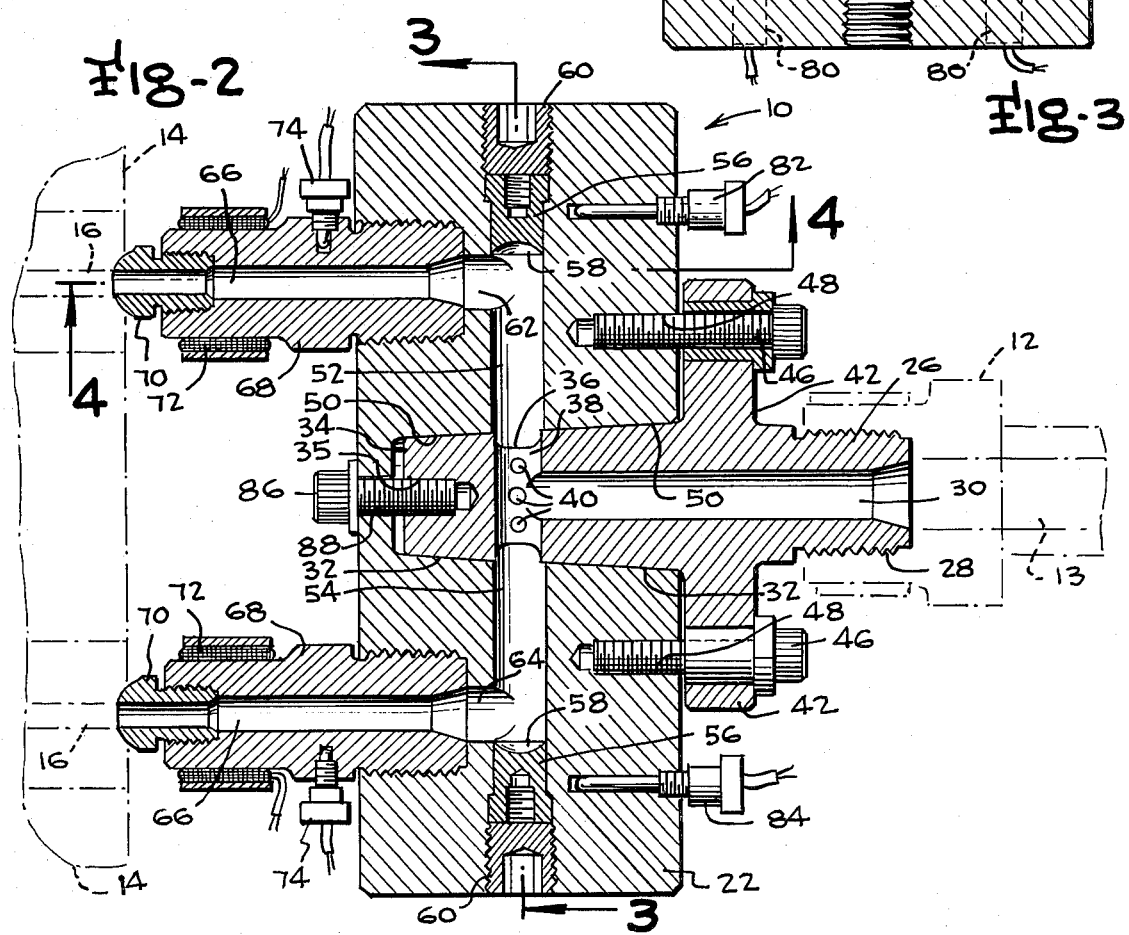

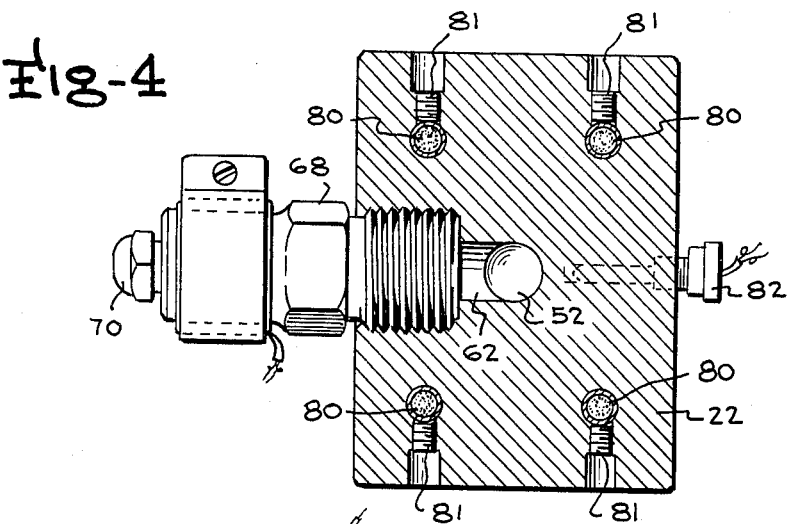
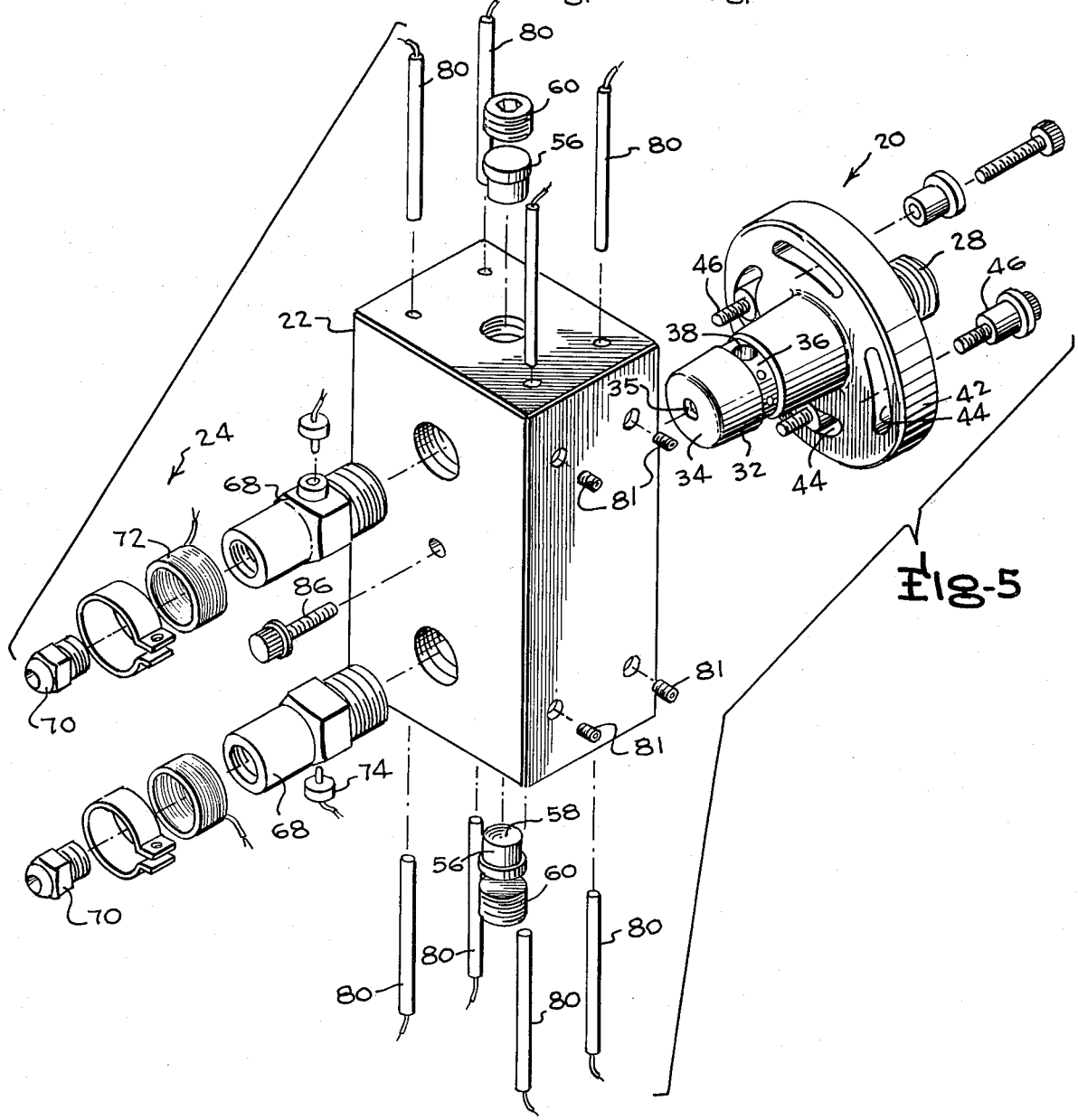

DOUBLE NOZZLE BLOCK

BACKGROUND OF THE INVENTION

The present invention is in the field of injection moulding and is more specifically directed to a new and improved double-nozzle injection system for injecting hot molten plastic into a mould.

Injection moulding has been in widespread use for a substantial number of years and has provided an efficient and economical way for producing many items of both simple and complex nature. Such systems employ an extruder capable of providing molten plastic at high pressure into a nozzle block on which a nozzle is mounted for engagement with an injection opening on the mould so that plastic is forced into the injection opening and into the confines of the mould to form the desired item. In moulding operations where the mould has only a single injection opening engageable with a single nozzle, problems of injection are minimal; however, more complex items require moulds having a pair of openings and a pair of nozzles for injecting liquid plastic into the cavities within the mould and it has been found that such systems frequently do not provide satisfactory performance. One of the problems in the use of plural nozzle systems is that the different cavities of the mould being filled by the different nozzles do not have the same volume and flow from one of the nozzles is terminated prior to the flow from the other nozzle. Consequently, the liquid plastic in the runners or conduits in the manifold block which lead directly to the first nozzle becomes stagnant and does not move while the remaining nozzle continues to discharge liquid plastic until its portion of the mould is filled. Stagnation of the plastic in the runners frequently results in overheating of certain areas by the electric heaters provided in the nozzle block so that the plastic becomes burned and discolored or deteriorates to such an extent as to preclude its satisfactory use in the formation of a subsequent item to be moulded. Although the flow rate through the different nozzles can be adjusted to permit completion of the injection from both nozzles at approximately the same time, the foregoing problem of thermal degradation can still occur due to the slow movement of the plastic in the runners supplying a nozzle having a low flow rate. The burning and thermal degradation in most cases is particularly acute in areas such as 90° turns and the like where the liquid plastic can tend to accumulate and remain stationary so as to permit eventual overheating.

Therefore, it is the primary object of this invention to provide a new and improved double-nozzle injector system.

A further object of the present invention is the provision of a new and improved double-nozzle injector system which will avoid thermal damage to molten plastic material being used in the system.

SUMMARY OF THE INVENTION

Achievement of the foregoing objects is enabled by the preferred embodiment which includes a manifold block from which a pair of spaced nozzle members extend with the interior of the manifold block including first and second coaxial runners extending perpendicularly to the nozzle members with a curved special adaptor plug having a spherical concave surface being provided in the end of each of the runners for directing molten plastic to its respective associated nozzle. The runners intersect at a central location at a conical interior sealing surface extending inwardly from one face of the manifold block.

An elongated spindle coupling is threadably connected on an outer end to an extruder and includes an external conical sealing surface matingly engageable with the internal conical sealing surface of the manifold block into which the spindle is inserted. The spindle coupling further includes an axial supply passageway extending along a portion of its length and terminating at a main outflow passageway extending diametrically across the spindle coupling with the ends of the main flow passageway being in alignment with the inner ends of each of the runner conduits in the manifold block. Additionally, an annular groove extends about the periphery of the spindle member and is bisected by the outer ends of the main outflow passageway with a plurality of angularly spaced smaller radial flush passageways extending between the annular flushing groove and the main outflow passageway so that molten plastic injected through the spindle is discharged into the runner conduit with flow through the radial flush passageways preventing any stagnation and thermal degradation of the molten plastic. The spindle means also includes a flange abuttable against the outer surface of the manifold block and having arcuate slots through which cap screws mounted in the block extend. The arcuate slots permit rotary adjustment of the manifold block with respect to the spindle so as to permit proper rotary positioning and alignment of the nozzle members for a particular mould. Additionally, individually controlled cartridge type heaters are mounted in the manifold block for providing independent controlled heat to the block so as to permit maintaining of the molten plastic contents thereof at optimum temperature without any danger of burning.

A better understanding of the manner in which the preferred embodiment achieves the foregoing objects will be enabled when the following detailed description is considered in conjunction with the appended drawings in which like reference numerals are used for the same parts as illustrated in the different figures.

BRIEF DESCRIPTION OF THE DRAWINGS

FIG. 1 is a perspective view of the preferred embodiment;

FIG. 2 is a sectional view taken along lines 2—2 of FIG. 1;

FIG. 3 is a sectional view taken along lines 3—3 of FIG. 2;

FIG. 4 is a sectional view taken along lines 4—4 of FIG. 2; and

FIG. 5 is an exploded perspective view of the preferred embodiment.

DESCRIPTION OF THE PREFERRED EMBODIMENT

The preferred embodiment, generally designated 10, is designed to be mounted on the discharge coupling 12 of a conventional hot plastic extruder for receiving molten plastic under high pressure for injection into a mould 14 having injection inlet openings 16 for receiving the molten plastic as shown in FIG. 2. The three primary components of the system comprise an elongated spindle coupling 20, a manifold block 22 and a pair of nozzle assemblies 24 as best shown in FIG. 5.

The elongated spindle coupling 20 has an outer end portion 26 which is threaded at 28 so as to be threadably connectable into the extruder 12 with an axial supply bore or conduit 30 being in communication with the discharge conduit 13 of the extruder for receiving molten plastic therefrom. An external conical sealing surface 32 is provided to extend forwardly to an inner end surface 34 which has an axially positioned tapped opening 36. External conical sealing surface 32 is divided into two segments by an inwardly extending annular peripheral flushing groove 36. The inner end of the axial supply bore or conduit 30 communicates with a main outflow passageway 38 extending diametrically transversely through the spindle coupling as best shown in FIG. 3. A plurality of angularly spaced radial flush passageways 40 extend from the side wall of the main outflow passageway 38 outwardly to the annular peripheral flushing groove 36 for providing a function to be described hereinafter. A radial positioning flange 42 extends outwardly of the spindle coupling and is provided with a plurality of arcuate slots 44 through which cap screw assemblies 46 extend with the threaded inner end of the cap screws being received in threaded bores 48 provided in the manifold block 22.

Manifold block 22 includes an internal conical sealing surface 50 dimensioned to be sealingly and matingly engaged with the external conical sealing surface 32 of the spindle 20. First and second nozzle supply runners 52 and 54 are provided internally of the manifold block 22 and are axially aligned with respect to each other and in general alignment respectively with the opposite ends of the main outflow passageway 38 in the spindle coupling 20 as best shown in FIG. 2. Specially designated flow control plugs 56 having spherical surfaces 58 are positioned in the outer ends of the runners 52 and 54 and are held in position by socket set screws 60. Nozzle feed bores 62 and 64 communicate with the outer ends of the runners 52 and 54 adjacent the flow control plugs 56 and communicate on their opposite ends with axial bores 66 of nozzle bodies 68 having nozzle tips 70 designed for engagement with the openings 16 in the mould 14. Electric heaters 72 encircle the outer ends of the nozzle bodies with thermocouples 74 being mounted in the nozzle bodies in a conventional manner.

Eight cartridge type heaters 80 held in position by set screws 81 are provided in four bores extending from top to bottom on the mounting block 20 with upper and lower thermocouples 82 and 84 also being provided for detecting the temperature in the area of the block adjacent the flow control plugs 56. The thermocouples 82 and 84 respectively control the upper and lower cartridge type heaters 80. A cap screw 86 is mounted in an unthreaded bore 88 and has its threaded end portion threadably engaged with the threaded bore 35 in the spindle coupling for pulling the spindle coupling inwardly to effect sealing pressure between the surface 32 of the spindle coupling and the surface 50 of the manifold block. However, it should be observed that the manifold block can be rotated about the axis of the spindle coupling (which is coextensive with the axis of supply bore 30) following which the cap screws 42 are tightened to hold the manifold block in desired relative position with respect to the spindle body. Tightening of cap screw 86 effects the desired force between the tapered conical sealing surfaces so that the system can inject moltn plastic at high pressures.

In use, molten plastic flows from the extruder into the axial supply bore or conduit 30 and into the main outflow passageway 38. Most of the plastic will simply flow outwardly through opposite ends of the passageway 38 into the upper and lower nozzle supply runners 52 and 54; however, a small percentage of the plastic will exit via the radial flush passagways 40 to enter the annular flushing groove 36 and the exit into the runners 52 or 54 as shown by the arrows in FIG. 3.

When the main outflow passageway 38 is not oriented in a coaxial manner with respect to the runners 52 and 54, such as would occur when the manifold block is rotated about the axis of the spindle to a new position, a substantial amount of the liquid plastic will flow outwardly to the radial flush passageways 40 and then around through the arcuate flushing groove 36 to the runners 52 and 54. It sometimes occurs that one of the nozzle tips will complete filling its portion of the mould before the other nozzle tip has completed filling its portion of the mould. When this occurs, there is no stagnation in the vicinity of the annular flushing groove 36 etc. since the continued inward movement of the molten plastic outwardly through the radial flushing passageways 40 keeps the plastic in motion so that it does not become stationary and overheated. Moreover, the heat supplied to the manifold block is carefully controlled by the thermostats 82, 84 so that the upper and lower areas of the block receive varying amounts of heat as is required when different amounts of molten plastic are being discharged from the different nozzles.

Additionally, the special plugs 56 with their spherical surfaces 58 serve to effect a smooth and continuous flow to the nozzle feed bores 62 and 64 so that there are no corners or sharp angles in which the plastic can stagnate and become burned or thermally damaged.

Numerous modifications of the preferred embodiment will undoubtedly occur to those of skill in the art and it should be understood that the spirit and scope of the invention is to be limited solely by the appended claims.

I claim:

1. A double nozzle injector system for injecting hot molten plastic material comprising:
   an elongated spindle coupling having inner and outer ends and including:
      an external conical sealing surface extending outwardly from said inner end;
      connector means on one end connectable to a pressurized source of molten plastic material; a main outflow passageway extending diametrically transversely through the spindle conduit at a location spaced outwardly of said inner end thereof;
      an axial supply passageway extending between said outer end and said main outflow passageway;
      an annular peripheral flushing groove extending inwardly about the surface of said spindle coupling and intercepting said main outflow passageway at opposite ends thereof; and a plurality of radial flush passageways extending between said flushing groove and said main outflow passageway with said radial flush passageways being substantially smaller than said main outflow passageway so that their flow capacity is a small percentage of the flow capacity of said main outflow passageway;
   a manifold block having inner and outer face surfaces and including:
      an internal conical sealing surface extending inwardly from said outer face surface and matingly engageable with said external conical sealing surface of said spindle coupling; first and second nozzle supply runners each having one end termination at said internal conical sealing surface and communicating with said flushing groove and said main outflow passageway;

first and second nozzles respectively communicating with said first and second runners for receiving molten plastic material therefrom;

whereby molten plastic material flows through said axial supply passagewwy and outwardly through said main outflow passageway to said first and second runners and said first and second nozzles with a small percentage portion of the flow being outwardly through the radial flush passageways to the annular peripheral flushing groove and then into said first and second runners.

2. The system of claim 1 wherein said manifold block additionally includes first and second nozzle mounting bores respectively receiving said first and second nozzles and oriented perpendicularly with respect to said first and second runners with inner ends of said first and second nozzle mounting bores communicating with first and second nozzle feed bores respectively communicating with said first and second runners and plug means provided in said first and second runners immediately outwardly of the juncture of said nozzle feed bores with said first and second runners, each of said plugs including a spherical concave surface extending across the breadth of the runner in which it is positioned for smoothly deflecting molten plastic into the adjacent nozzle feed bore.

3. The system of claim 1 additionally including first and second groups of heaters respectively installed in a pattern around the first and second runners and first and second thermostats mounted in said manifold block for respectively controlling said first and second groups of heaters.

4. The system of claim 1 wherein six radial flush passageways extend between said flushing groove and said main outflow passageway.

5. The system of claim 1 additionally including a threaded drive member mounted in said manifold block in axial alignment with the axis of said internal conical sealing surface, said elongated spherical coupling including a tapped opening in its inner end for receiving said threaded drive member for permitting said threaded drive member to pull said elongated spindle coupling inwardly into sealing engagement of its external conical sealing surface with the internal conical sealing surface of the manifold block with a predetermined force.

6. The system of claim 1 wherein said elongated spindle coupling additionally includes a radial flange positioned adjacent the outer extent of said external conical sealing surface and including a plurality of arcuate slots through each of which a capscrew mounted in said nozzle manifold block extends so as to permit rotary positioning of said manifold block to a desired position with respect to said elongated spindle coupling following which the tightening of said capscrews effects the retention of said manifold block in said desired position.

7. The system of claim 6 wherein said manifold block additionally includes first and second nozzle mounting bores respectively receiving said first and second nozzles and oriented perpendicularly with respect to said first and second runners with inner ends of said first and second nozzle mounting bores communicating with first and second nozzle feed bores respectively communicating with said first and second runners and plug means provided in said first and second runners immediately outwardly of the juncture of said nozzle feed bores with said first and second runners, each of said plugs including a spherical concave surface extending across the breadth of the runner in which it is positioned for smoothly deflecting molten plastic into the adjacent nozzle feed bore.

8. The system of claim 7 additionally including first and second groups of cartridge type heaters respectively installed in a pattern around the first and second runners and first and second thermostats mounted in said manifold block for respectively controlling said first and second groups of heaters.

9. The system of claim 8 additionally including a threaded drive member mounted in said manifold block in axial alignment with the axis of said internal conical sealing surface, said elongated spherical coupling including a tapped opening in its inner end for receiving said threaded drive member for permitting said threaded drive member to pull said elongated spindle coupling inwardly into sealing engagement of its internal conical sealing surface with the internal conical sealing surface of the manifold block with a predetermined force.

* * * * *